UNITED STATES PATENT OFFICE 2,379,936

ANTIOXIDANT

Arthur W. Sloan, Stow, Ohio, assignor to The B. F. Goodrich Company, New York, N. Y., a corporation of New York No Drawing. Application September 25, 1941, Serial No. 412,304

20 Claims. (Cl. 260—809)

This invention relates to the preservation of rubber and of articles made from rubber, and also to the preservation of other oxidizable organic compounds. It pertains specifically to the antioxidant properties of the products obtained by reacting diarylamines with conjugated diolefins in the presence of an acidic catalyst.

It has already been proposed to employ the reaction products of certain unsaturated hydrocarbons with diarylamines as antioxidants for organic materials which tend to decompose by absorption of oxygen from the atmosphere. In particular, it has been proposed to react the terpenes with diarylamines in the presence of an acidic catalyst, and to use the products of the reaction as antioxidants for rubber. Rubber compositions containing small amounts of these age-resisters show a resistance to deterioration by aging in air or oxygen which is superior to that of a similar rubber composition containing no antioxidant. The terpene hydrocarbons may have one or more carbon-carbon double bonds. In general, however, these double bonds are not conjugated. Similar results may be obtained with other similar olefins.

I have now discovered that antioxidants greatly superior to the afore-mentioned materials may be obtained by reacting open-chain conjugated diolefins containing less than eight carbon atoms in the chain with diarylamines in the presence of an acid catalyst. Among the hydrocarbons which give satisfactory results are butadiene-1,3; piperylene (pentadiene-1,3); isoprene; 2-methyl pentadiene-1,3; 2,3-dimethyl butadiene-1,3; 2,3-dimethyl pentadiene-1,3; hexadiene-1,3; 2-methyl hexadiene-1,3; 5-methyl hexadiene-1,3; hexadiene-2,4; heptadiene-2,4; heptadiene-1,3; and other similar compounds. Among the diarylamines which yield suitable products are diphenylamine, phenyl-alpha-naphthylamine, phenyl-beta-naphthylamine, the ditolylamines, the phenyltolylamines, the dinaphthylamines, anilino tetraphenylmethane, phenyl-p-xenylamine, dixenylamine, dianilino-diphenylmethane, p-hydroxydiphenylamine, p-aminodiphenylamine, U, N'-diphenyl-p-phenylenediamine, anilino-bi-phenylene oxide, anilino-acridine, 6-anilino quinoline, p-chlorodiphenylamine, p-isopropoxydiphenylamine, and the like. Reaction products of diarylamines with alcohols, aldehydes, and ketones are also the chemical equivalents of the diarylamines themselves for this reaction.

The catalysts which may be used for the synthesis of my new antioxidants comprise such materials as HCl, $H_3PO_4$, $H_2SO_4$, $NaHSO_4$, $ZnCl_2$, $AlCl_3$, $BF_3$, $SnCl_4$, $NH_4Br$, $I_2$, etc. In general, any of the well-known acidic condensation catalysts may be used. It appears that a mixture of several materials, the chemical structure of some of which is not definitely known, results when the reaction is carried out as hereinafter described.

The reaction can usually be carried out at a temperature of 50° to 300° C., and at either atmospheric or elevated pressure, depending upon the reagents used.

As a specific example of my invention I have prepared an antioxidant by heating one molecular equivalent of butadiene with two molecular equivalents of diphenylamine in the presence of 0.1 molecular equivalent of zinc chloride at a temperature of about 200° C. for four to five hours in an autoclave equipped with a stirrer. The reaction mixture is then washed with hot water under pressure and with a strong caustic solution. The mixture, after heating at reduced pressure to distill off the unreacted hydrocarbon and diphenylamine, is a dark oily liquid.

The relative proportions of the reactants are not restricted to those of the specific example, but may be varied over a wide range. In general, neither reactant should be present in an amount greatly exceeding six times that of the other. The relative proportions used in the example, however, give better results than other mixtures.

The product consists largely of a diarylamine containing a nuclear-substituted unsaturated hydrocarbon side-chain, but other compounds hitherto unknown, among which are some alicyclic compounds, are also present. It is impossible to obtain the reaction products of this invention, with their superior antioxidant properties, by any other known means.

As an example of the antioxidant power of these compounds, I have prepared the following rubber composition in which the parts are by weight:

| | |
|---|---:|
| Rubber | 100.0 |
| Zinc oxide | 5.0 |
| Sulfur | 3.0 |
| Carbon black | 50.0 |
| Stearic acid | 3.5 |
| Pine tar | 3.0 |
| Captax | 1.0 |
| Antioxidant | 2.0 |
| | 167.5 |

The following table gives the ultimate tensile strength (T) in pounds per square inch, and ultimate elongation (E) in per cent for the foregoing composition containing various antioxidants cured at 279° F. for 30, 60, or 90 minutes, and aged as indicated. Sample A contained no antioxidant; sample B contained the butadiene-diphenylamine reaction product described above as a typical example of my new antioxidant; sample C contained a product made by condensing two molecular proportions of diphenylamine with one molecular proportion of pentene-2 under the same conditions, as a typical example of unconjugated olefin-diphenylamine reaction products.

*Before aging*

| Cure, time in minutes | A | | B | | C | |
|---|---|---|---|---|---|---|
| | T | E | T | E | T | E |
| 30 | 3,500 | 635 | 3,130 | 680 | 3,160 | 630 |
| 60 | 3,900 | 576 | 3,760 | 620 | 3,620 | 580 |
| 90 | 3,780 | 515 | 3,730 | 595 | 3,690 | 560 |

*Aged 96 hours in Bierer-Davis Bomb*
(In oxygen at 70° C. and 300 lb./sq. in.)

| Cure, time in minutes | A | | B | | C | |
|---|---|---|---|---|---|---|
| | T | E | T | E | T | E |
| 30 | 1,180 | 475 | 2,760 | 600 | 2,470 | 575 |
| 60 | 820 | 315 | 2,810 | 505 | 2,200 | 430 |
| 90 | 810 | 230 | 2,690 | 465 | 2,210 | 415 |

Similar results can be obtained with the reaction products of other conjugated diolefins and diphenylamine. It is quite apparent from these data that my new antioxidants are much more effective than those made by condensing unconjugated olefins with diarylamines.

My new compounds are also of great value when used in mixtures along with alkylated diarylamines. The components of the mixture appear to be mutual activators. A mixture consisting of one part of the antioxidant used in example B and two parts of the antioxidant used in example C was compounded in the same rubber composition as was used in the foregoing examples. The ultimate tensile strength and elongation of the composition were measured before and after aging 96 hours in oxygen at a pressure of 300 lb. per sq. inch and 70° C.

*Before aging*

| Cure | T | E |
|---|---|---|
| 30 | 3,620 | 625 |
| 60 | 4,080 | 595 |
| 90 | 4,120 | 555 |

*After aging*

| Cure | T | E |
|---|---|---|
| 30 | 2,660 | 600 |
| 60 | 2,570 | 505 |
| 90 | 2,350 | 415 |

The compositions were also aged 14 days in a Geer oven at 70° C. and flexed on a DeMattia flexing machine at 80° F. at the rate of 300 flexures per minute. On a scale ranging from 0 (no cracks) to 10 (rupture), B was rated 4.2, C 6.2, while the sample containing the mixture was only 2.5 after 1,100,000 flexures. Similar results can be obtained by using mixtures of other alkylated diaryl amines and the reaction products of conjugated diolefins of any chain length with diarylamines. The alkylated diarylamines may be prepared by reacting olefins, such as butene-2, pentene-2, hexene-1, hexene-2, a heptene, an octene, etc., with a diarylamine in the presence of an acidic catalyst under conditions similar to those used for the conjugated diolefin reaction. Or, if desired, an alcohol may be condensed with a diarylamine under similar conditions. Suitable alcohols comprise the butanols, the pentanols, diisopropyl carbinol, the hexanols, the heptanols, and the like.

My new compounds are effective in amounts ranging from 0.1 to 5% of the rubber composition. They may also be used for the preservation of other organic substances which tend to deteriorate in the presence of oxygen, such as fish oils, linseed oil, tung oil, gasolines containing unsaturates, and the like. They are effective with any kind of rubber, such as caoutchouc, balata, gutta percha, latex, reclaimed rubber, artificial rubber isomers, and such synthetic rubbers as polychloroprene, copolymers of butadiene with acrylonitrile, styrene, methyl acrylate, methyl methacrylate, isobutylene, and other copolymerizable monomers.

These new antioxidants may be added to the material to be preserved in any suitable manner. They may be added in the form of a solution, or dissolved as they are. They may be added to rubber, for example, on a roll mill or in an internal mixer or by any other suitable method. They may be applied to the surface of the rubber composition either in their pure form or as a solution in a suitable solvent, or they may be dispersed in the rubber latex. They are applicable to any type of rubber or synthetic rubber composition such as those used in the manufacture of hose, belting, rubber threads, rubberized fabrics, boots, shoes, molded goods, tires and inner tubes, latex dipped goods, etc.

They may be used in conjunction with any of the ordinary pigments, fillers, dyes, accelerators of vulcanization or other antioxidants used in rubber compositions.

Although I have herein disclosed specific examples of my invention, I do not intend to limit myself thereto, for many modifications and variations will be apparent to those skilled in the art.

I claim:

1. The method of retarding the deterioration of materials which tend to decompose in the presence of oxygen which comprises treating them with the product obtained by condensing a conjugated diolefin containing less than eight carbon atoms with a diarylamine in the presence of an acidic condensation catalyst.

2. The method of preserving a rubber which comprises treating it with a mixture comprising a substantial proportion of each of two ingredients, an alkylated diarylamine and the product obtained by condensing a conjugated diolefin with a diarylamine in the presence of an acidic condensation catalyst.

3. The method of retarding the deterioration of materials which tend to decompose in the presence of oxygen which comprises treating them with the product obtained by condensing a conjugated diolefin containing less than eight carbon atoms with diphenylamine in the presence of an acidic condensation catalyst.

4. The method of preserving a rubber which comprises treating it with the product obtained by condensing a conjugated diolefin containing less than eight carbon atoms with a diarylamine in the presence of an acidic condensation catalyst.

5. The method of preserving a rubber which comprises treating it with a mixture comprising a substantial proportion of each of two ingredients, an alkylated diarylamine and the product obtained by condensing butadiene-1,3 with a diarylamine in the presence of an acidic condensation catalyst.

6. The method of preserving a rubber which comprises treating it with the product obtained by condensing a conjugated diolefin containing less than eight carbon atoms with diphenylamine in the presence of an acidic condensation catalyst.

7. The method of preserving a rubber which comprises treating it with the product obtained by condensing butadiene-1,3 with a diarylamine in the presence of an acidic condensation catalyst.

8. The method of preserving a rubber which comprises treating it with the product obtained by condensing butadiene-1,3 with diphenylamine in the presence of an acidic condensation catalyst.

9. The method of preserving a rubber which comprises treating it with the product obtained by condensing isoprene with a diarylamine in the presence of an acidic condensation catalyst.

10. The method of preserving a rubber which comprises treating it with a mixture comprising a substantial proportion of each of two ingredients, an alkylated diarylamine and the product obtained by condensing butadiene-1,3 with diphenylamine in the presence of an acidic condensation catalyst.

11. The method of preserving a rubber which comprises treating it with the product obtained by condensing piperylene with a diarylamine in the presence of an acidic condensation catalyst.

12. A rubber composition comprising a rubber and a mixture comprising a substantial proportion of each of two ingredients, an alkylated diarylamine and the product obtained by condensing a conjugated diolefin with a diarylamine in the presence of an acidic condensation catalyst.

13. A rubber composition comprising a rubber and the product obtained by condensing a conjugated diolefin containing less than eight carbon atoms and a diarylamine in the presence of an acidic condensation catalyst.

14. A rubber composition comprising a rubber and the product obtained by condensing a conjugated diolefin containing less than eight carbon atoms with diphenylamine in the presence of an acidic condensation catalyst.

15. A rubber composition comprising a rubber and the product obtained by condensing butadiene-1,3 with a diarylamine in the presence of an acidic condensation catalyst.

16. A rubber composition comprising a rubber and the product obtained by condensing butadiene-1,3 with diphenylamine in the presence of an acidic condensation catalyst.

17. A rubber composition comprising a rubber and the product obtained by condensing isoprene with a diarylamine in the presence of an acidic condensation catalyst.

18. A rubber composition comprising a rubber and a mixture comprising a substantial proportion of each of two ingredients, an alkylated diarylamine and the product obtained by condensing butadiene-1,3 with a diarylamine in the presence of an acidic condensation catalyst.

19. A rubber composition comprising a rubber and the product obtained by condensing piperylene with a diarylamine in the presence of an acidic condensation catalyst.

20. A rubber composition comprising a rubber and a mixture comprising a substantial proportion of each of two ingredients, an alkylated diarylamine and the product obtained by condensing butadiene-1,3 with a diarylamine in the presence of an acidic condensation catalyst.

ARTHUR W. SLOAN.

CERTIFICATE OF CORRECTION.

Patent No. 2,379,936. July 10, 1945.

ARTHUR W. SLOAN.

It is hereby certified that error appears in the printed specification of the above numbered patent requiring correction as follows: Page 1, first column, line 46, for "U," read --N,--; and that the said Letters Patent should be read with this correction therein that the same may conform to the record of the case in the Patent Office.

Signed and sealed this 11th day of December, A. D. 1945.

Leslie Frazer

(Seal) First Assistant Commissioner of Patents.